United States Patent Office 3,181,984
Patented May 4, 1965

3,181,984
CLEANING AND BRIGHTENING OF SOLDER

William J. Tillis, Levittown, N.J., assignor to FMC Corporation, New York, N.Y., a corporation of Delaware No Drawing. Filed May 4, 1962, Ser. No. 192,317
10 Claims. (Cl. 156—20)

This invention relates to the cleaning and brightening of lead-tin solders, and particularly to a method of removing from solder-plated etched copper circuits, discoloration and deposits produced thereon by persulfates employed in etching the copper.

Copper printed circuits are commonly produced by adhering copper foil to a fiber or plastic sheet backing, protecting the desired circuit pattern by applying a resist to circuit pattern areas of the foil, and subjecting the composite to the action of an etchant to selectively dissolve soil in areas free of resist, thereby leaving behind a so-called printed circuit having on it the resist material.

A variety of etchants have been employed in this process; until quite recently, ferric chloride, chromic acid and the like acid solutions having been the principal etching agents. These acids are very effective in dissolving copper; however, they involve the use of highly toxic, and frequently noxious, solutions which are difficult to handle and provide serious problems in the discarding of wastes. Because of these difficulties, within the past few years the various water-soluble dipersulfates, hereinafter referred to as persulfates, have taken over in a large part of the copper-etching industry. The persulfates are essentially non-toxic, and are easily handled both as etchant solutions and as wastes. A preferred process for employing these etchants is described and claimed in U.S. Patent 2,978,301.

The persulfates, however, have had one serious disadvantage in the production of printed circuits. When lead-tin solders are employed as resists in the manufacture of the circuits, a practice which is desirable particularly because the solder which remains on the circuit is easily connected, for example by dip-soldering, to other circuit elements, the persulfate used in etching the copper causes formation of dark discoloration and a white powdery deposit on the surface of the solder. This of course means that an additional operation must be carried out to remove these deposits and discolorations; if they are not removed, the resulting printed circuit has a surface which is not electrically clean, and which eventually may cause corrosion of the system in which the printed circuit is employed. Furthermore, the appearance of the solder-plated circuit is so unattractive that producers of electrical finished products will not employ them.

Several means of removing the deposits and discoloration have been devised. One involves treating the affected solder with an aqueous hydrochloric acid solution to loosen foreign matter, and thereafter mechanically abrading the loosened material with a wire brush or the like to remove it. This process involves both a chemical and a mechanical treatment; neither the hydrochloric acid, nor the abrasion, treatment by itself both removes the deposits and overcomes discoloration, and this combination process has been unacceptable to the trade. Another means has been to immersion tin-plate the affected areas; this method does not eliminate the white deposits from the persulfate-treated solder surface, and these deposits adversely affect solderability of the circuit while in time corrosion and other side effects are caused by the tin deposits.

It therefore has been desired, and it is a feature of this invention, to provide a simple immersion process and a solution therefor which will clean and brighten a solder having a persulfate-modified surface, in a short time and at normal temperatures to produce a durable and attractive product.

It has now been found, quite unexpectedly, that an aqueous solution containing about 5 to 50% by weight, and preferably 5 to 25% by weight, of fluoboric acid, and about 5 to 15% by weight of thiourea, and preferably also containing about 0.1 to 1% of a cationic or nonionic wetting agent, will clean and brighten persulfate-modified solder surfaces to provide a clean and shiny surface which can be readily soldered or otherwise affixed to other circuit components to provide electrically clean connections, by simple immersion of the solder in the solution for about 45 seconds to 3 minutes at normal operating temperatures of about 90° to 150° F., and preferably at about 100° to 130° F. The excellent effect of the herein coacting ingredients is particularly surprising when it is realized that neither thiourea nor fluoboric acid alone, nor combinations of thiourea with strong mineral acids closely related to fluoboric acid, such as sulfuric acid and nitric acid, are effective in cleaning and brightening such solder surfaces.

The solder to be treated is produced by contact of a solder, which may comprise 40 to 80% of lead and 60 to 20% of tin, if desired along with small amounts of modifying ingredients, with an aqueous persulfate solution containing 5 to 40% of a soluble persulfate, for example, ammonium persulfate, sodium persulfate, potassium persulfate, or lithium persulfate. Such solutions containing in addition a small amount of a mercury salt are particularly desirable for etching copper, since the rate of dissolution of the copper by the persulfate is increased markedly by the presence of the mercury salt. This is described in U.S. Patent 2,978,301. Furthermore, the persulfate solution with or without the catalyst dissolves copper more rapidly at elevated temperatures such as 120° to 150° F. The effect of the persulfate on the solder is particularly aggravated when copper ions are present in the persulfate solution, a condition which is encountered in the production of copper printed circuits in which solder masks the circuit pattern on a backed copper foil.

The persulfate has several objectionable effects on the solder. Firstly, it produces a darkening of the copper surface, turning it black over considerable areas. This blackening is noted only when copper ions are present in the persulfate solution. Furthermore, if copper metal is present in the solution, it deposits on selective areas of the solder. Finally, a white powdery deposit forms on the surface of the solder, a phenomenon not related to the presence of copper ions in the solution. Any one of these undesirable effects renders the solder product unacceptable commercially, both because it is not electrically clean, and because the deposits and discoloration both lead to corrosion of the product in use and a decidedly unattractive appearance.

The solution used to remove these undesirable surface characteristics from the solder must contain, together, about 5 to 50%, and preferably about 5 to 25%, by weight of fluoboric acid, and about 5 to 15% by weight of thiourea. Neither ingredient alone will provide the herein excellent cleaning and brightening results.

It has been found that substitution of the strong mineral acids nitric acid or sulfuric acid for the fluoboric acid in the formulation produces a solution which is not effective in cleaning and brightening solder.

Additionally, the effect of these two ingredients is enhanced by the presence of a cationic or nonionic wetting agent in the amount of about 0.1 to 1%. Typical useful wetting agents are the cationic agents triethanolamine hydrochloride and alkyl dimethyl hydroxyethyl ammonium bromide, and the nonionic agent isooctyl phenyl polyethoxy ethanol. Obviously other wetting agents of the cationic and nonionic types will be suitable.

Temperature and time conditions for the herein operation are interdependent. At low temperatures, the cleaning and brightening process requires longer contact times than it does at elevated temperatures. Most desirably, the operation will be conducted at about 100° to 130° F., although it can be conducted at temperatures below or above this level, for example at 90° to 150° F. Within the desired temperature range of 100° to 130° F., the solder will be cleaned and brightened satisfactorily in as little as about 45 seconds to about 3 minutes. Immersion for longer times does not have any deleterious effect on the product, but is unnecessary. As stated above, at lower temperatures, longer times will be required for cleaning and brightening, whereas at higher temperatures, shorter times will be required. Obviously operation at too high temperatures is undesirable from an equipment and handling point of view, and sufficient time advantage is not present at such temperatures to render it desirable to go substantially above 150° F.

The following examples are given by way of illustration only and are not to be deemed limiting of conditions or materials in any way.

*Example 1*

A solder wire composed of 61% lead and 39% tin, and measuring 6 inches long by ⅛ inch in diameter, was cleaned by abrasion with pumice. The cleaned solder wire was then immersed for 2 minutes at 120° F. in a 25% ammonium persulfate solution containing 5 p.p.m. of mercuric chloride, 1.5% of sulfuric acid and 2 ounces per gallon of dissolved copper. The solution is typical of solutions provided in the etching of printed copper circuits. A solution of fluoboric acid and thiourea was then provided by dissolving these two ingredients along with Triton X–100 in tap water to provide the following solution:

| | |
|---|---|
| Fluoboric acid (48–50%) ml | 100 |
| Thiourea (tech. grade) gm | 100 |
| Triton X–100 (isooctyl phenyl polyethoxy ethanol) ml | 10 |
| Water to 1 liter. | |

The solder specimen was immersed for 2 minutes in 100 ml. of this solution in a polyethylene tank. The solution was maintained during immersion at 120° F. The specimen was then removed and air dried, and examined. Whereas the specimen prior to immersion in the solution had a dark black surface with spots of copper and white powdery deposits, after treatment with the above solution of fluoboric acid and thiourea, it was clean and bright.

*Example 2*

The procedure of the above example was repeated twice, with the modification that in one case potassium persulfate and in the other sodium persulfate replaced the ammonium persulfate in the solution used to degrade the solder surface. Stained specimens similar to those obtained in Example 1 were produced. Treatment of these specimens with the fluoboric acid-thiourea solution of Example 1 provided clean, shining products.

*Example 3*

Example 1 was repeated, in this case employing an aqueous solution of fluoboric acid and thiourea containing 5% of fluoboric acid and 5% of thiourea, along with 0.5% of triethanol amine hydrochloride. This solution in 2 minutes at 120° F. provided a clean, bright surface to the solder specimen.

*Example 4*

The process of Example 1 was followed again, in this instance employing an aqueous solution containing 15% by weight of thiourea and 45% by weight of fluoboric acid with no wetting agent. Again the solder was cleaned and brightened, in this example in only about 60 seconds, when the specimen was immersed in the solution at 120° F.

*Example 5*

The process of Example 1 was repeated, with the temperature of the fluoboric acid-thiourea solution being varied. It was found that the time required to clean and brighten the surface varied with temperature, as shown in the following table.

| Temperature, ° F.: | Time to brighten (seconds) |
|---|---|
| 90° | 180 |
| 110° | 120 |
| 120° | 90 |
| 130° | 60 |
| 150° | 45 |

*Example 6*

A 0.0014 inch copper foil was cemented to a 0.125 inch thick phenolic resin impregnated fiber backing sheet measuring 6 inches by 9 inches, and a printed circuit pattern plated onto the copper. The plate was composed of 58% lead and 42% tin. This plate, the resist for a subsequent etching operation, was cleaned in a vapor degreaser. The composite was etched in a 25% solution of ammonium persulfate containing 1.5% sulfuric acid and 5 p.p.m. mercuric chloride catalyst. A solution of fluoboric acid and thiourea was then provided by dissolving these two ingredients along with Triton X–100 in tap water to provide the following solution:

| | |
|---|---|
| Fluoboric acid (48–50%) ml | 100 |
| Thiourea (tech. grade) gm | 100 |
| Triton X–100 (isooctyl phenyl polyethoxy ethanol) ml | 10 |
| Water to 1 liter. | |

The solder specimen was immersed for 2 minutes in 100 ml. of this solution in a polyethylene tank. The solution was maintained during immersion at 120° F. The specimen was then removed and air dried, and examined. Whereas the specimen prior to immersion in the solution had a dark black surface with spots of copper and white powdery deposits, after treatment with the above solution of fluoboric acid and thiourea, it was clean and bright.

Pursuant to the requirements of the patent statutes, the principle of this invention has been explained and exemplified in a manner so that it can be readily practiced by those skilled in the art, such exemplification including what is considered to be the best embodiment of the invention. However, it should be clearly understood that, within the scope of the appended claims, the invention may be practiced by those skilled in the art, and having the benefit of this disclosure, otherwise than as specifically described and exemplified herein.

I claim:

1. Method of cleaning and brightening lead-tin solder which has been modified by an aqueous persulfate solution, which comprises contacting said solder with an aqueous solution containing 5 to 15% by weight of thiourea and 5 to 50% by weight of fluoboric acid until the solder has a clean, bright surface, and removing the solder from said solution.

2. Method of claim 1 in which the fluoboric acid-thiourea solution contains 5 to 15% by weight of thiourea and 5 to 25% by weight of fluoboric acid, along with 0.1 to 1% of a wetting agent from the group consisting of nonionic and cationic wetting agents.

3. Method of claim 1 in which the temperature of the solution of fluoboric acid and thiourea is maintained at about 90° to 150° F. during its period of contact with the solder.

4. Method of claim 1 in which the temperature of the solution of fluoboric acid and thiourea is maintained at about 100° to 130° F. during its period of contact with the solder.

5. Method of cleaning and brightening a persulfate-modified lead-tin solder plate on a printed circuit which was produced by selective etching of copper in an aqueous etching bath, comprising contacting said persulfate-modified solder with an aqueous solution containing 5 to 15% by weight of thiourea and 5 to 50% by weight of fluoboric acid until the solder has a clean, bright surface, and removing the printed circuit from said solution.

6. Method of claim 5 in which the fluoboric acid-thiourea solution contains 5 to 15% by weight of thiourea and 5 to 25% by weight of fluoboric acid, along with 0.1 to 1% of a wetting agent from the group consisting of nonionic and cationic wetting agents.

7. Method of claim 5 in which the temperature of the solution of fluoboric acid and thiourea is maintained at about 90° to 150° F. during its period of contact with the solder.

8. Method of claim 5 in which the temperature of the solution of fluoboric acid and thiourea is maintained at about 100° to 130° F. during its period of contact with the solder.

9. Aqueous solution for cleaning and brightening lead-tin solder which has been modified by an aqueous persulfate solution, consisting essentially of 5 to 15% by weight of thiourea, 5 to 50% by weight of fluoboric acid and the balance essentially water.

10. Aqueous solution of claim 9 containing 5 to 25% by weight of fluoboric acid.

References Cited by the Examiner

UNITED STATES PATENTS

| | | | |
|---|---|---|---|
| 2,502,337 | 3/50 | Moir | 156—18 X |
| 2,746,848 | 5/56 | Jones | 156—8 |
| 2,978,301 | 4/61 | Margulies et al. | 156—18 X |

FOREIGN PATENTS

| | | |
|---|---|---|
| 612,586 | 1/61 | Canada. |

EARL M. BERGERT, *Primary Examiner.*

JACOB STEINBERG, *Examiner.*